United States Patent [19]

Viet

[11] Patent Number: 4,659,890
[45] Date of Patent: Apr. 21, 1987

[54] PROCESS AND APPARATUS FOR MICROWAVE HEATING FOODS

[75] Inventor: Toai L. Viet, Vevey, Switzerland

[73] Assignee: Nestec S.A., Vevey, Switzerland

[21] Appl. No.: 809,224

[22] Filed: Dec. 16, 1985

[30] Foreign Application Priority Data

Jan. 25, 1985 [CH] Switzerland ............... 329/85

[51] Int. Cl.⁴ .............................. H05B 6/78
[52] U.S. Cl. ............. 219/10.55 M; 219/10.55 E; 219/10.55 F; 99/421 P; 99/DIG. 14; 426/243
[58] Field of Search ......... 219/10.55 F, 10.55 E, 219/10.55 R, 10.55 M, 10.55 A, 389, 392; 99/421 P, 421 V, 421 R, DIG. 14, 451; 426/241, 243, 523

[56] References Cited

U.S. PATENT DOCUMENTS

| | | | |
|---|---|---|---|
| 3,427,422 | 2/1969 | Muller | 219/10.55 R |
| 3,494,722 | 2/1970 | Gray | 219/10.55 R X |
| 3,676,058 | 7/1972 | Gray | 219/10.55 R X |
| 3,744,403 | 7/1973 | Castronuovo | 219/389 X |
| 3,777,095 | 12/1973 | Muranaka | 219/10.55 A |
| 4,286,133 | 8/1981 | Einset et al. | 219/10.55 E |
| 4,571,474 | 2/1986 | Pomroy | 219/10.55 F |

*Primary Examiner*—Philip H. Leung
*Attorney, Agent, or Firm*—Vogt & O'Donnell

[57] ABSTRACT

The invention relates to a process and an apparatus for heating foods oblong in shape. This apparatus comprises a reheating enclosure with a microwave source and an inclined preferably circular plate rotatably mounted substantially at its center on a drive shaft, in which said rotating plate comprises arranged uniformly around its periphery, at least two holders for foods perpendicular to the plane of the plate. This apparatus provides for the uniform distribution of heat throughout the treated food.

17 Claims, 2 Drawing Figures

PROCESS AND APPARATUS FOR MICROWAVE HEATING FOODS

This invention relates to a process and an apparatus for reheating food in a microwave energy field.

Microwave ovens are known and are being increasingly used, particularly in so-called fast-food catering, for reheating precooked or frozen foods. The problem with these microwave ovens is that there is no uniform distribution of energy, i.e. during reheating, it frequently happens that internal zones of the food are not unfrozen and hot, leaving the consumer with an unfavorable impression during eating of the food in question. Swedish Patent Application No. 78 10 570 also relates to a microwave oven for treating frozen foods comprising a reheating compartment, a microwave source and a slightly inclined rotating disc. This disc is designed to receive the food, particularly sausages, to be reheated and comprises around its periphery a retaining edge to stop the sausages from leaving the disc. The disadvantage of this microwave oven is that it only enables a single food item to be reheated which necessitates a fixed-energy microwave source and does not allow the system to be effectively used in fast-food catering. Also, because the disc is inclined in relation to the horizontal plane, the risks of the food being incorrectly positioned on the disc are increased, resulting in irregular distribution of heat as in conventional microwave ovens.

U.S. Pat. No. 3,676,058 relates to an apparatus for sterilizing or pasteurizing such products as milk, fruit or vegetables by microwave energy. This known apparatus comprises a principal plate rotating about a vertical axis and a mechanical system of gears defining small rotating tables so as to produce planetary movement. The disadvantage of this system is that, on the one hand, it requires a complex and onerous mechanical assembly and, on the other hand, produces only a two-dimensional movement for the product to be treated.

The present invention relates to a process and an apparatus which obviate the disadvantages of the prior art by reducing the energy costs, by reducing the time of reheating, by guaranteeing a uniform distribution of heat throughout the treated food and by enabling the power of the microwave source to be regulated.

The invention relates to a process for reheating foods oblong in shape, in a microwave energy field in which the foods are reheated by being made to rotate in the microwave field in a first mechanical movement about an axis inclined in relation to the vertical and in a second, non-mechanical movement about their own axis substantially parallel to the inclined axis.

In view of the fact that a microwave field has minima and maxima in space, it is desirable to expose every part of the foods to the energy maxima in space. To this end, therefore, the foods to be reheated have to be moved in all three dimensions. In the process according to the invention, the foods are reheated by being subjected to two movements, namely a mechanical movement about an axis inclined in relation to the vertical and a second movement about their own lengthwise axis, this second movement being generated by virtue of the inclination, the weight of the food and the mechanical rotation. Foods which have been fully exposed to the maxima of the microwave energy are thus obtained.

The movement of the foods thus created is a planetary movement.

In this planetary movement, the foods rotate about an axis which is at an angle of from 40° to 65° in relation to the vertical with respect to a horizontal plane. The mechanical rotation of the foods takes place at a speed of from 10 to 20 revolutions per minute.

The present invention also relates to an apparatus or oven for reheating foods comprising a reheating enclosure with a microwave source and an inclined, preferably circular plate rotatably mounted substantially at its center on a drive shaft, in which said rotating plate comprises, arranged uniformly around its periphery, at least two holders for foods perpendicular to the plane of the circular plate.

The holders for foods are shaped in such a way that they substantially follow the shapes of the foods to be reheated. In this connection, the length and diameter of said holders are such that the foods project beyond and move freely in said holders because, as mentioned above, it is essential according to the invention that the foods to be reheated be on the one hand entrained in the rotating movement of the inclined plate and, on the other hand, undergo a circular movement about their own lengthwise axis by virtue of their inclined position and under their own weight. Accordingly, each food to be reheated thus makes a planetary movement in the oven. This planetary movement in space makes it possible for each food to be reheated to receive all the microwave energy unevenly distributed in the oven, ensuring better temperature distribution in the foods to be reheated.

The holders may be made up from several rods which do not absorb the microwave energy, for example of glass, teflon, polycarbonate or plastics as in the prior art. The presence of openings between the rods provides for effective ventilation of the product, thus leading to a food of crispy character.

Such holders formed by rods are arranged directly on the rotating inclined plate. In one advantageous embodiment, it is also possible to provide these holders for foods on a second plate mounted on the rotating plate. The advantage of this embodiment is that it enables the circular plate to be changed which facilitates washing of the plates and avoids mixtures of tastes between different foods to be reheated. It is thus possible to provide plates having different numbers of holders according to the type and number of foods to be reheated.

Whether or not the holders are arranged on a removable rotating plate, their number depends on the space available in the microwave oven and on the power of the microwave source. However, this number is not critical. It is preferably between 2 and 6. If two holders for foods are provided, they are arranged diametrically opposite one another on the plate. Three or four holders for foods are preferably provided. As already mentioned, a variable-energy microwave source may be provided and adapted according to the quantity of foods to be reheated.

The microwave source is a magnetron of the type used in conventional ovens. This magnetron is separated from the reheated enclosure by a partition. The reheating enclosure is totally impermeable to the microwaves, that is to say it does not allow the microwave energy to escape into the surrounding space. The foods to be reheated are loaded and unloaded by hand.

The type of foods which it is possible to finish cooking and/or to reheat in the apparatus according to the invention is not critical. The foods in question may be any type of precooked, cold or frozen foods, for example sausages, products based on precooked bakers' dough containing a sausage of the so-called hot-dog type or a frozen, savory or dessert filling. In the latter case, the apparatus according to the invention finishes cooking the bread and defrosts and reheats the filling. In this case, too, the inclined position of the foods to be reheated has an additional advantage because it prevents the filling from overflowing during reheating.

The circular plate is inclined at an angle of from 40° to 65° in relation to the vertical with respect to the horizontal plane which provides for maximum sweeping of space and facilitates induction of the planetary movement.

Advantageously, the apparatus additionally comprises a steam extraction system which is particularly necessary during the defrosting and reheating of foods.

The invention is described in more detail in the following with reference to the accompanying drawing, wherein.

Figure 1:
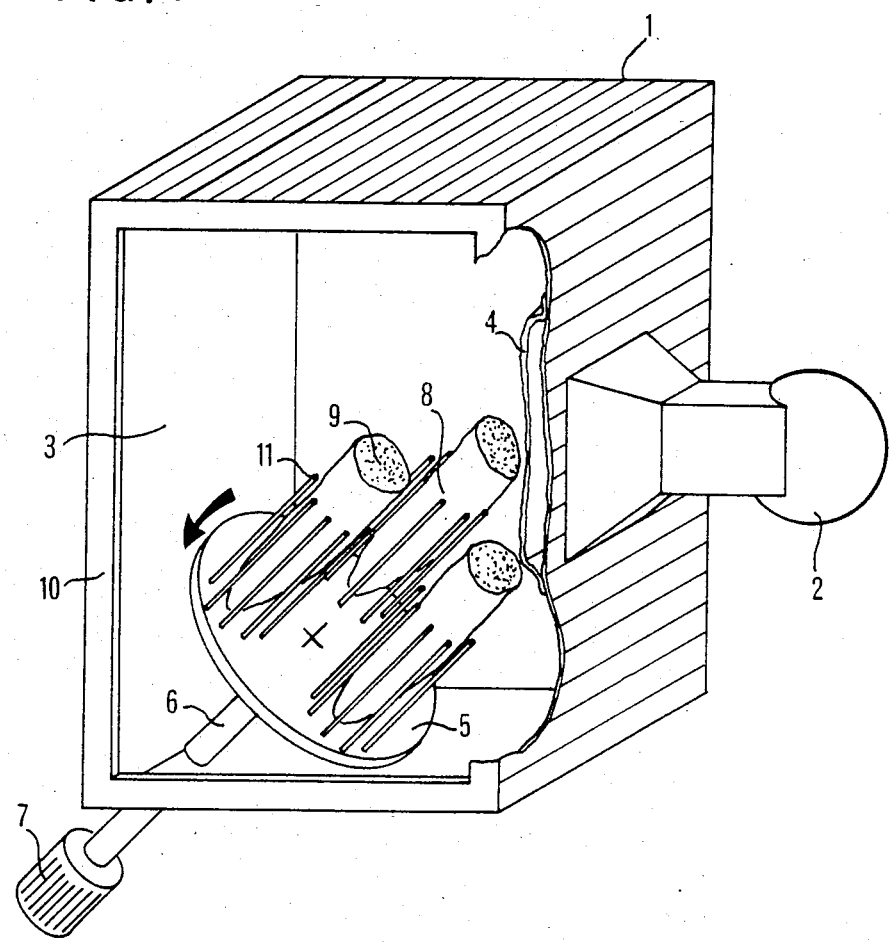
FIG. 1 is a perspective view of the apparatus according to the invention.

The reference (1) denotes the reheating enclosure comprising the mains-powered magnetron (2) and the reheating chamber (3) itself. The partition (4) enables the magnetron to be protected against dust and other extraneous matter. Inside the chamber (3) there is an inclined plate (5) mounted at its center on a rotatable shaft (6) driven by a motor (7). The Figure shows a configuration of the inclined plate with three holders (8) for foods (9). These holders (8) are fixed, perpendicular to the plate (5) and formed by rods (11).

When it is desired to use the apparatus according to the invention, the foods (9) are loaded through the door (10) and the magnetron and the motor driving the plate (5) are switched on.

The plate rotates in the direction indicated by the arrow and the foods (9), for example a baguette or part of a baguette lined with a frozen filling, rotate with the plate and inside the holder (8) about their own lengthwise axis substantially parallel to the shaft (6).

After a very short time of the order of a few minutes, the filled baguette is ready to be eaten. The magnetron is switched off, the baguettes ready for eating are unloaded and the oven filled with another batch.

Figure 2:
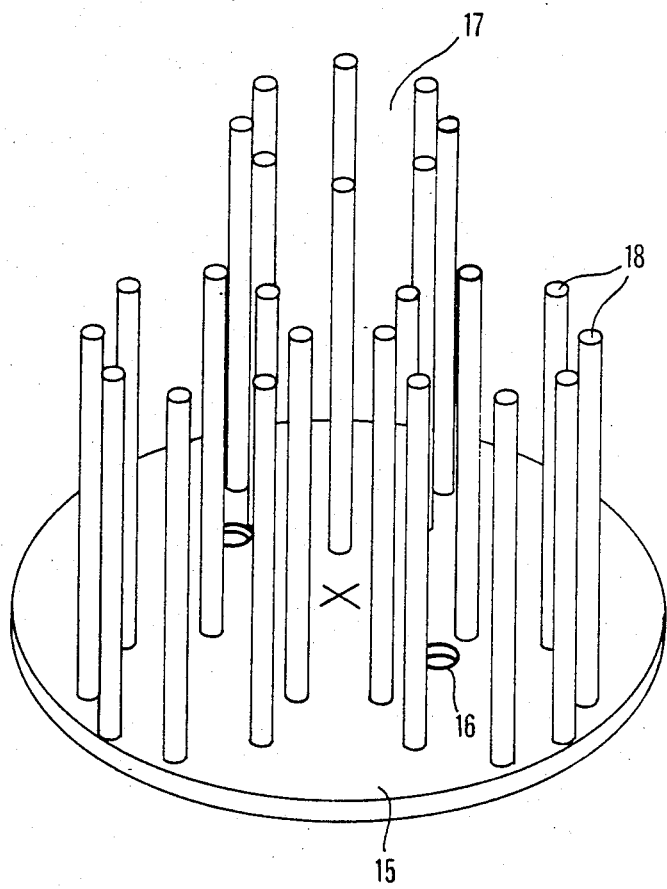
FIG. 2 shows an embodiment of the second plate designed to be mounted on the rotating plate.

FIG. 2 shows an embodiment with a second removable plate (15) designed to be mounted on a rotating inclined plate (not shown). This rotating plate comprises pins engaging corresponding bores (16) in the disc (15). The plate (15) comprises three holders (17) for foods which are formed by a plurality of rods (18) that do not absorb microwave energy. The openings between the rods constitute a holder which provides for an effective flow of air which in turn leads to a crispy reheated food.

The process and apparatus according to the invention provide for rapid operation with a significant saving of energy in view of the number of baguettes reheated at the same time to obtain a food uniformly reheated by virtue of its planetary movement in the reheating compartment.

Using, for example, a source of microwave energy of from 1 to 2 KW for a frequency of 2450 MHz, it is possible to reheat foods in 2 to 3 minutes.

I claim:

1. A process for heating foods, oblong in shape, comprising loading and arranging the oblong shaped foods lengthwise in holders about the periphery of and perpendicular to the plane of a rotatable plate such that the foods are capable of freely rotating about their lenghwise axes in the holders, exposing the loaded plate and foods to a microwave energy field while rotating the plate about its axis such that the plate is vertically inclined to the microwave energy field and such that the foods are entrained within the holders by the rotating movement of the plate and rotate freely within the holders about their lengthwise axes and make a planetary movement.

2. A process as claimed in claim 1, wherein the lengthwise axes of the holders are substantially parallel to the axis of the plate.

3. A process as claimed in claim 2 wherein the vertically inclined plate is at an angle of from 40° to 65° with respect to a horizontal plane.

4. A process as claimed in claim 2 or 3, wherein the foods are rotated at 10 to 20 revolutions per minute about the axis of the plate.

5. A process as claimed in claim 1, wherein the holders are equidistantly arranged on the plate.

6. An apparatus for heating foods, oblong in shape, comprising an enclosure containing a microwave source for producing a microwave energy field, a vertically inclined plate within the enclosure, a drive to rotate the plate, at least two holders for the foods arranged about the periphery of the plate and perpendicular to the plane of the plate wherein the holders are shaped such that the oblong shaped foods are held lengthwise and such that upon rotation of the vertically inclined plate, the foods are entrained about the axis of rotation by the holders and are capable of rotating freely within the holders about their lengthwise axes and make a plenetary movement in the microwave field.

7. An apparatus as claimed in claim 6, wherein the length of the holders is such that the foods heated in the holders project beyond the length of the holders.

8. An apparatus as claimed in claim 6 or 7, wherein each holder is formed by a plurality of rods which do not absorb microwave energy.

9. An apparatus as claimed in claim 6, further comprising a second plate upon which the rotatable plate is removably mounted.

10. An apparatus as claimed in claim 6 or 9, wherein there are between 2 and 6 holders for the foods.

11. An apparatus as claimed in claim 6 or 9, wherein the microwave source is of variable energy.

12. An apparatus as claimed in claim 9, wherein the plates are inclined at an angle of from 40° to 65° with respect to a horizontal plane.

13. An apparatus as claimed in claim 6, wherein the plate is inclined at an angle of from 40° to 65° (relative) with respect to a horizontal plane.

14. An apparatus as claimed in claim 6, wherein the rotatable plate is mounted substantially at its center on a drive shaft.

15. An apparatus as claimed in claim 6, wherein the plate is circular.

16. An apparatus as claimed in claim 6, wherein the holders are arranged equidistantly on the plate.

17. An apparatus as claimed in claim 6, wherein the plate is removable.

* * * * *

UNITED STATES PATENT AND TRADEMARK OFFICE
CERTIFICATE OF CORRECTION

PATENT NO. : 4,659,890
DATED : April 21, 1987
INVENTOR(S) : Toai Le Viet

It is certified that error appears in the above-identified patent and that said Letters Patent is hereby corrected as shown below:

On the Title page of the Patent:

in the caption heading, "Viet" should read --Le Viet--.

under the "Inventor:" subsection, "Toai L. Viet" should read --Toai Le Viet--.

Signed and Sealed this

Eighteenth Day of August, 1987

*Attest:*

DONALD J. QUIGG

*Attesting Officer*   *Commissioner of Patents and Trademarks*